(12) United States Patent
Miller et al.

(10) Patent No.: US 8,094,515 B2
(45) Date of Patent: Jan. 10, 2012

(54) SEISMIC DATA VISUALIZATIONS

(75) Inventors: Matthew C. Miller, Cypress, TX (US); Richard Tachon, Houston, TX (US); Kamran Nadim, Horsham (GB); Stephen David Hall, Burgess Hill (GB)

(73) Assignee: WesternGeco L.L.C., Houston, TX (US)

( * ) Notice: Subject to any disclaimer, the term of this patent is extended or adjusted under 35 U.S.C. 154(b) by 428 days.

(21) Appl. No.: 12/349,977

(22) Filed: Jan. 7, 2009

(65) Prior Publication Data

US 2010/0172209 A1 Jul. 8, 2010

(51) Int. Cl.
*G01V 1/00* (2006.01)
(52) U.S. Cl. .............................. 367/72; 367/37; 367/68
(58) Field of Classification Search .................. 367/7–9, 367/37, 38, 68, 72; 702/1, 2, 14, 16, 17
See application file for complete search history.

(56) References Cited

U.S. PATENT DOCUMENTS

| | | | | |
|---|---|---|---|---|
| 4,204,279 A | * | 5/1980 | Parrack et al. | 367/40 |
| 4,797,860 A | | 1/1989 | Quaglino | |
| 4,803,669 A | * | 2/1989 | Airhart | 367/72 |
| 4,860,265 A | | 8/1989 | Laster et al. | |
| 5,056,066 A | * | 10/1991 | Howard | 367/72 |
| 5,067,112 A | * | 11/1991 | Meek et al. | 367/43 |
| 5,191,526 A | * | 3/1993 | Laster et al. | 702/17 |
| 5,583,825 A | * | 12/1996 | Carrazzone et al. | 367/31 |
| 5,671,344 A | * | 9/1997 | Stark | 345/419 |
| 5,696,735 A | * | 12/1997 | Krebs | 367/50 |
| 5,784,335 A | * | 7/1998 | Deplante et al. | 367/72 |
| 6,424,464 B1 | * | 7/2002 | Neff et al. | 359/451 |
| 6,446,007 B1 | | 9/2002 | Finn et al. | |
| 6,446,008 B1 | * | 9/2002 | Ozbek | 702/17 |
| 6,545,944 B2 | * | 4/2003 | de Kok | 367/56 |
| 6,574,566 B2 | | 6/2003 | Grismore et al. | |
| 6,697,737 B2 | | 2/2004 | Jones et al. | |
| 6,738,715 B2 | * | 5/2004 | Shatilo et al. | 702/17 |
| 6,865,521 B1 | * | 3/2005 | Padgett | 703/2 |
| 6,925,387 B2 | | 8/2005 | Marin et al. | |
| 6,987,878 B2 | * | 1/2006 | Lees et al. | 382/154 |
| 7,266,041 B1 | * | 9/2007 | Padgett | 367/72 |
| 7,453,767 B1 | * | 11/2008 | Padgett | 367/73 |
| 2002/0075759 A1 | * | 6/2002 | Zhou et al. | 367/38 |
| 2002/0105857 A1 | | 8/2002 | Ren et al. | |
| 2003/0078734 A1 | * | 4/2003 | Ozbek | 702/14 |
| 2005/0038605 A1 | * | 2/2005 | Marin et al. | 702/14 |
| 2007/0247973 A1 | * | 10/2007 | Robinson et al. | 367/50 |
| 2008/0033655 A1 | * | 2/2008 | Ozbek et al. | 702/17 |
| 2008/0137479 A1 | * | 6/2008 | Syljuasen et al. | 367/72 |
| 2008/0165186 A1 | * | 7/2008 | Lin | 345/419 |

(Continued)

OTHER PUBLICATIONS

Milkereit, B; Spencer, C. "Multiattribute Processing of Seismic Data : Application to Dip Displays" Canada Geological Survey Can. J. Explor. Geophys. v.23, Nos. 1-2, pp. 47-53, Dec. 1990.*

(Continued)

*Primary Examiner* — Thomas Tarcza
*Assistant Examiner* — James Hulka

(57) ABSTRACT

Implementations of various technologies for a method for processing seismic data. A first portion of a record of pre-stack seismic data may be displayed in a three-dimensional XYZ (3-D XYZ) space. A selection may be received of a second portion of the record of the pre-stack seismic data within the first portion. One or more attributes may be determined that define the second portion. One or more regions may be identified within the record of the pre-stack seismic data having the attributes that define the second portion.

12 Claims, 9 Drawing Sheets

U.S. PATENT DOCUMENTS

2008/0285384 A1* 11/2008 James .......................... 367/72

OTHER PUBLICATIONS

Saadati Nejad, M R; Hassani, H; Khorasani, M M; Javaherian, A; Sokooti, M R. "Application of Spectral Decomposition Seismic Attribute for Identification Geological Characteristics" 71st EAGE Balancing Global Resources/SPE Europec Conference [Amsterdam 09] (Amsterdam, The Netherlands, Jun. 8-11, 2009).*

Wen, J; McMechan, G A; Booth, M W. "Three-Dimensional Modeling and Migration of Seismic Data Using Fourier Transforms" Geophysics V 53, No. 9, pp. 1194-1201, Sep. 1988 (ISSN 00168033; 15 Refs).*

Stoffa, P L; Kessinger, W P; Fokkema, J T; De Luna Freire, R M. "Split-Step Fourier Migration" 56th Annu Soc Explor Geophys Int Mtg (Houston, Nov. 2-6, 1986) Pap; Geophysics V 55, No. 4, pp. 410-421, Apr. 1990.*

PCT Search Report, dated Aug. 20, 2010, Application No. PCT/US2010/020239.

* cited by examiner

600

SEISMIC DATA VISUALIZATIONS

BACKGROUND

1. Field of the Invention

Implementations of various technologies described herein generally relate to methods and systems for visualizing seismic data.

2. Description of the Related Art

The following descriptions and examples are not admitted to be prior art by virtue of their inclusion within this section.

Seismic data signals are typically acquired by measuring and recording data during a seismic survey. A seismic survey may be performed by repeatedly firing an impulsive seismic energy source at the surface of the earth, sea or seafloor and recording the received signals at a set of receivers. The receivers may typically be situated at the same surface as the source, but laterally displaced on regular grid positions. However, there may be situations where a non-regular distribution of the receivers is preferred or where the source and the receivers may be positioned at different depth levels. In a typical seismic survey, the source and the receivers may be displaced at fixed intervals (e.g., 25 meters) and in a certain direction (e.g., the "inline" direction).

During the seismic survey, the cycle of firing the source and recording the received signals may be repeated a plurality of times. When firing the seismic source, a pressure wave may be excited and propagated into the subsurface. The pressure wave reflects off interfaces between various earth layers (such as rock, sand, shale, and chalk layers) and propagates upwardly to the set of receivers, where the particle velocity of the wave vibrations or the pressure oscillations of the wave may be measured and recorded.

The strength of the reflected wave is proportional to the amount of change in elastic parameters, e.g., density, pressure velocity, and shear velocity, at the respective interfaces. Consequently, the data recorded by the receivers represents the elastic characteristics of the subsurface below the receivers.

SUMMARY

Described herein are implementations of various technologies for a method for processing seismic data. In one implementation, a first portion of a record of pre-stack seismic data may be displayed in a three-dimensional XYZ (3-D XYZ) space. A selection may be received of a second portion of the record of the pre-stack seismic data within the first portion. One or more attributes may be determined that define the second portion. One or more regions may be identified within the record of the pre-stack seismic data having the attributes that define the second portion.

Described herein are implementations of various technologies for a method for visualizing seismic data. In one implementation, a selection may be received of a portion of a plurality of locations of shot points. The shot point gathers corresponding to the shot points at the selected portion of locations may be determined. The shot point gathers may be combined into a 3-dimensional (3-D) cube of shot point gathers. The shot point gathers at the selected portion of locations in a 3-dimensional XYZ (3-D XYZ) space may also be displayed.

In another implementation, a selection may be received of a portion of a record of seismic data in the 3-D XYZ space. The selected portion may be transformed to a three-dimensional FKK (3-D FKK) space. The selected portion may be displayed in the 3-D FKK space. A selection may be received of a filter in the 3-D FKK space. The filter may be applied to the selected portion in the 3-D FKK space. The filtered selected portion may be transformed to the 3-D XYZ space. The filtered selected portion may be displayed in the 3-D XYZ space.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to a system for visualizing seismic data. In general, seismic data may be displayed in a 3 dimensional (3-D) XYZ space. A user may select a portion or all of the displayed data, which may be converted to a visualization in 3-D frequency-wavenumber-wavenumber (FKK) space. The user may select a 3-D FKK filter by clicking and dragging with a pointer device in the 3-D FKK visualization. The filtered data may then be converted to and displayed in the 3-D XYZ space. One or more implementations of various techniques for visualizing seismic data will now be described in more detail with reference to FIGS. 1-7 in the following paragraphs.

Figure 1:
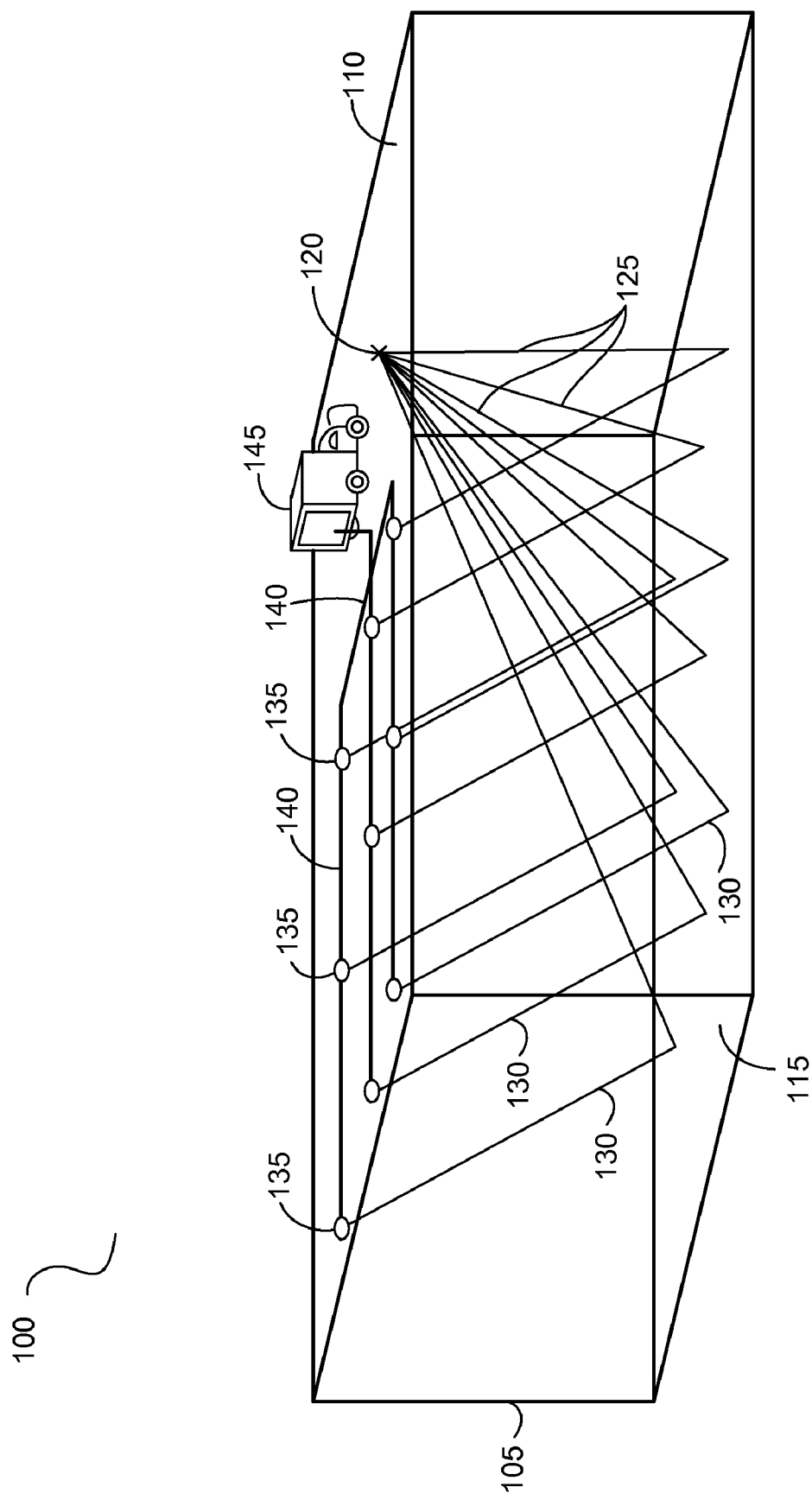
FIG. 1 illustrates a land-based survey of a subterranean geological formation in accordance with one or more implementations of various techniques described herein.

FIG. 1 illustrates a land-based survey 100 of a subterranean geological formation 105 in accordance with one or more implementations of various techniques described herein. The geological formation 105 includes the surface 110 and a reflector 115. The geological survey 100 includes an elastic source 120 that fires elastic waves 125 (only three are indicated) into the geological formation 105. The elastic waves 125 may include a compressional wave ("P-wave") and a shearwave ("S-wave"), neither of which are shown. The component(s) of the elastic wave 125 may be reflected, and may be converted, by the reflector 115, and the reflections 130 (only three indicated) may be received by a plurality of seismic sensors 135 (only three indicated).

The seismic sensors 135 may generate electrical signals (not shown) representative of the received reflections 130. The electrical signals may be embedded with information regarding the geological formation 105. The electrical signals may be transmitted over the lines 140 to a recording truck 145, where the electrical signals may be captured as a record of seismic data. Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by each of the seismic sensors.

Furthermore, the implementations of various technologies described herein may be performed on virtually any seismic data, regardless of how they are acquired. The seismic survey 100 may therefore be a subsea survey or conducted in transitional zones between land and water. The information embedded in the electrical signals that are generated by the seismic sensors may also, in some implementations, be transmitted wirelessly. Once captured, the record of seismic data may be processed in accordance with various implementations described herein.

Selection and Application of 3-D FKK Filter

Figure 2:
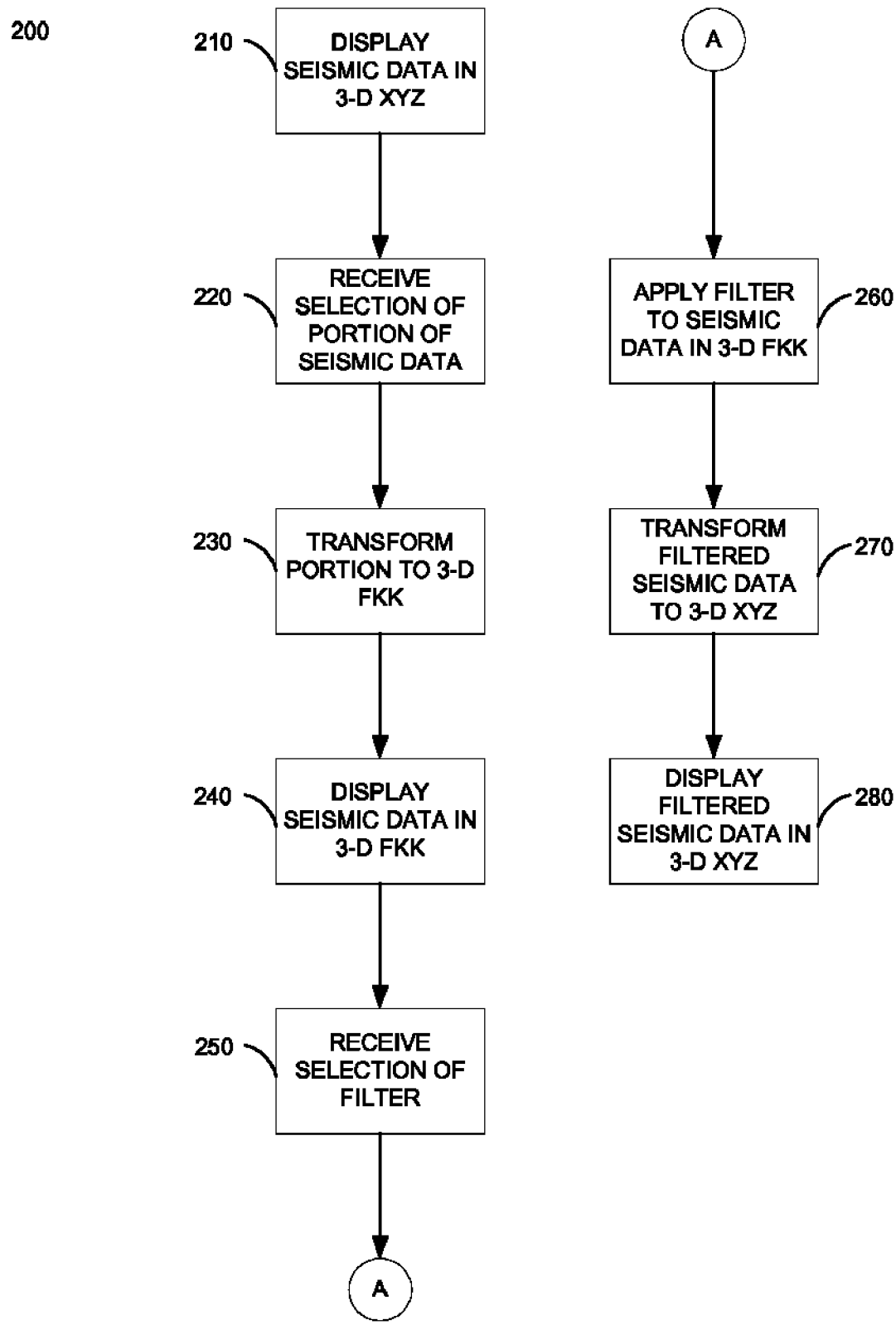
FIG. 2 illustrates a flow chart of a method for visualizing seismic data according to implementations described herein.

FIG. 2 illustrates a flow chart of a method 200 for visualizing seismic data according to implementations described herein. It should be understood that while the flow chart indicates a particular order of execution of the operations, in some implementations, certain portions of the operations might be executed in a different order.

Method 200 will be described with reference to FIG. 3A, which illustrates a transformation of seismic data from a 3-dimensional XYZ (3-D XYZ) space 300 to a 3-dimensional frequency-wavenumber-wavenumber (3-D FKK) space 310'; and FIG. 3B, which illustrates a transformation of seismic data from the 3-D FKK space 310' to a 3-D XYZ space 320'. It should be noted that the 3-D XYZ space may represent a geographical space such as the geological formation 105.

At step 210, a record of the seismic data may be displayed in the 3-D XYZ space 300. The seismic data may depict a conceptualized visualization of a portion of the geological formation 105. The seismic data may include pre-stack or post-stack data.

At step 220, a selection of a portion 310 of the record of seismic data in the 3-D XYZ space 300 may be received. The portion 310 is also referred to herein as a probe 310. In one implementation, the user may define the probe 310 interactively, e.g., graphically through a user interface. In such an implementation, the user may define the probe 310 by clicking and dragging between two coordinates in the 3-D XYZ space, using a mouse or similar input device.

Once defined, the user may manipulate the probe 310 within the 3-D XYZ space, modifying the dimensions, and/or the position of the probe 310. For example, the probe 310 may be attached to the 3-D XYZ space. Where the probe 310 is attached, rotation, translation, or zooming of the 3-D XYZ space may also rotate, translate and zoom the probe 310.

In another implementation, the user may define a type for the probe 310. The types may include pre-stack seismic data such as a common midpoint gather, a common conversion point gather, a common image point gather, a common receiver gather or areal gather/cross spreads.

At step 230, the seismic data in the probe 310 may be transformed to the 3-D FKK space. Some types of noise are more easily distinguished in the 3-D FKK space than 3-D XYZ space. Transforming to the 3-D FKK space enables the user to attenuate these types of noise then transform the data back into the 3-D XYZ space.

In one implementation, the transform of seismic data into the FKK space may be a 3-D Fourier transform. In mathematics, the Fourier transform is an operation that transforms one function of a real variable into another. The new function, often called the frequency domain representation of the original function, describes which frequencies are present in the original function.

At step 240, the transformed probe may be displayed in the 3-D FKK space 310'. The 3-D FKK space 310' may include all of the seismic data in the probe 310 translated to the 3-D FKK space.

At step 250, a selection of a filter 320 in the 3-D FKK space 310' may be received. The filter 320 may be selected from within the 3-D FKK space 310', similar to the manner described above for selecting the probe 310. The filter 320 may define ranges in the frequency, x-wavenumber, and y-wavenumber dimensions within which to filter the seismic data.

Figure 3A:
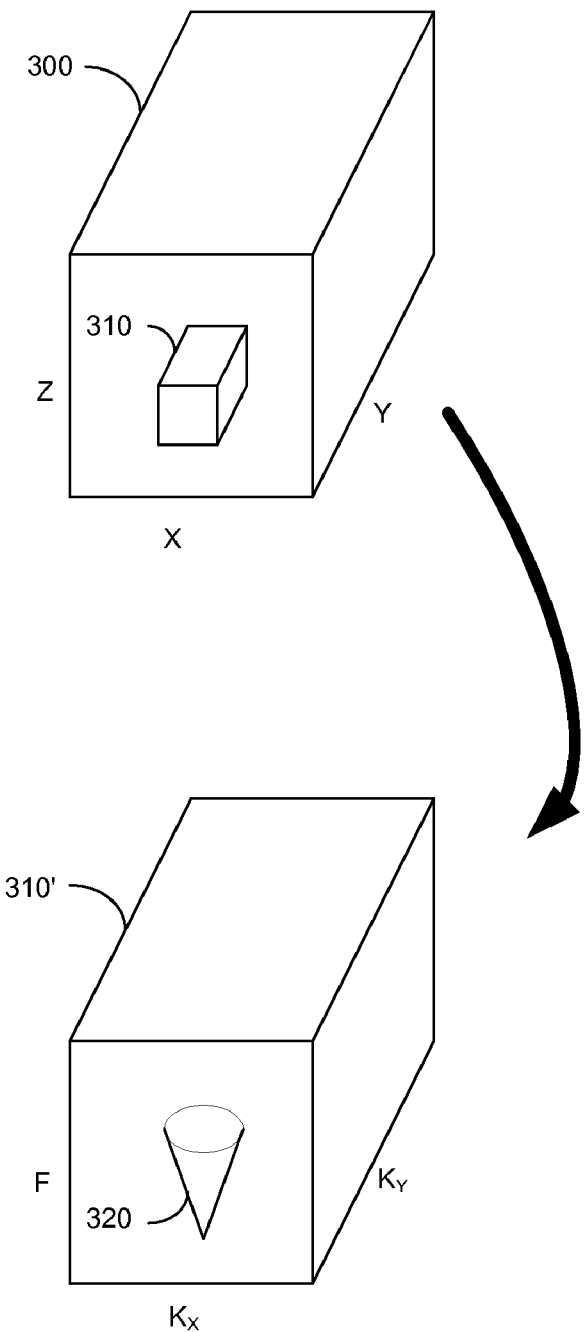
FIG. 3A illustrates a transformation of seismic data from a 3-dimensional XYZ (3-D XYZ) space to a 3-dimensional frequency-wavenumber-wavenumber (3-D FKK) space.
Figure 3B:
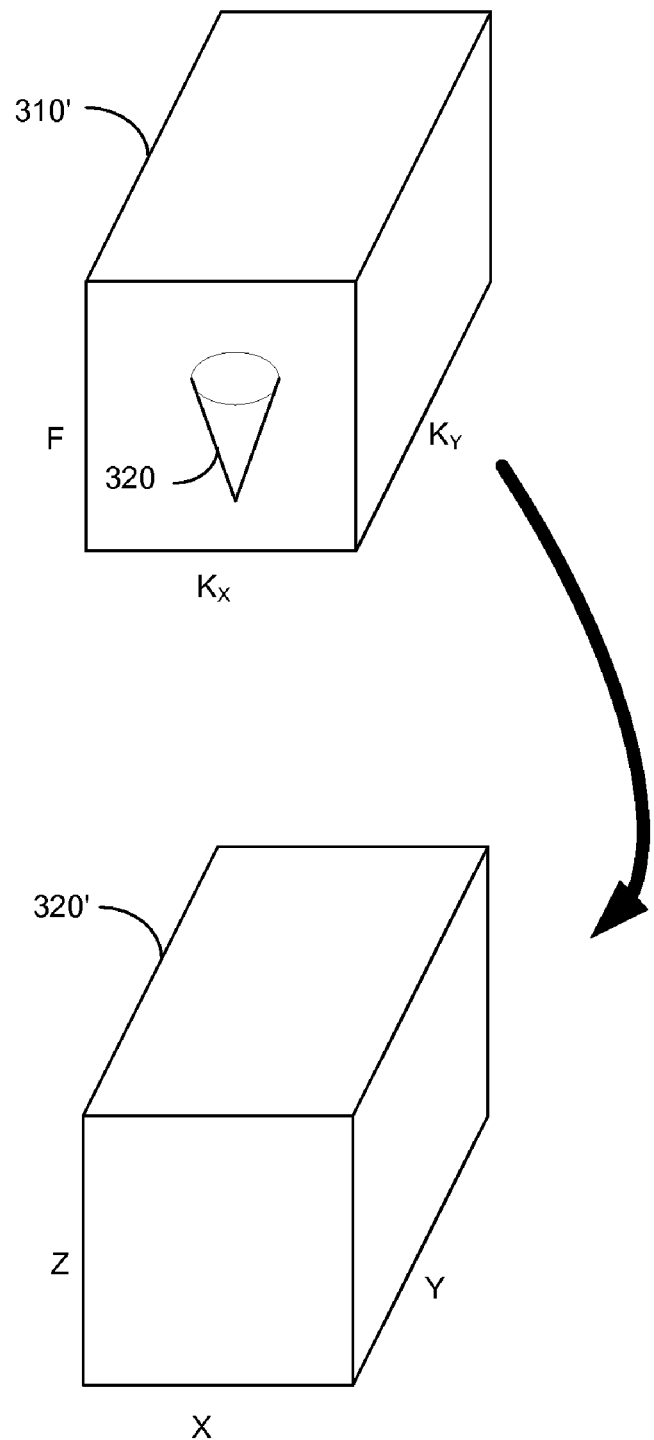
FIG. 3B illustrates a transformation of seismic data from the 3-D FKK space to the 3-D XYZ space.

As shown in FIG. 3A, the filter 320 may be in the shape of a cone. In other implementations, however, the filter may be in other shapes, such as a cylinder or a polygon. The shapes listed are merely examples, and are not intended to limit implementations of various technologies described herein. In another implementation, the filter 320 may be defined with parameters, such as smallest dip inline, largest dip inline, smallest dip crossline, and largest dip crossline. In yet another implementation, the parameters may be automatically selected based on a user selection of the region to be attenuated.

At step 260, the filter 320 may be applied to the seismic data in the 3-D FKK space 310'. As a result, only the seismic data either within or without the frequency, x-wavelength, and y-wavelength dimensions may be displayed in the 3-D FKK space. FIG. 3B illustrates the filter 320 within which the filtered seismic data may be displayed.

At step 270, the filtered seismic data may be transformed from the 3-D FKK space to the 3-D XYZ space. With reference to FIG. 3B, the filtered seismic data inside or outside the filter 320 is transformed to the 3-D XYZ space 320'. In one implementation the transform is performed using an inverse 3-D Fourier transform. At step 280, the filtered seismic data may be displayed in the 3-D XYZ space 320'. In this manner, the user may compare the seismic data in 3-D XYZ and 3-D FKK space, before and after attenuation.

Identifying, Interpolating Attributes of Selected Features

Figure 4:
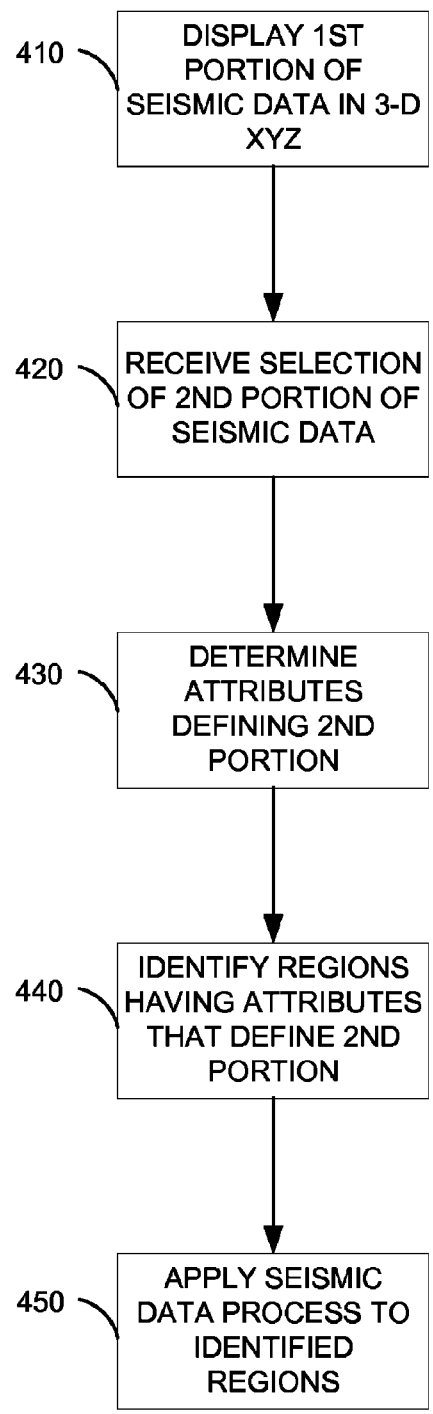
FIG. 4 illustrates a flowchart of a method for processing seismic data according to implementations described herein.

FIG. 4 illustrates a flowchart of a method 400 for processing seismic data according to implementations described herein. Typically, a seismic data process such as, a noise reduction process, may be applied to a full gather of the seismic data. However, applying the seismic data process to the full gather may be computationally expensive. Accordingly, the method 400 enables the user to select a portion of the seismic data for processing. The seismic data process may be then applied only to the selected portion instead of the full gather.

For example, a certain portion of the seismic data may contain a noise train feature. In such a case, it may be desirable to perform a noise attenuation process only on the portion of seismic data that contains the noise train feature.

Additionally, a noise train such as that identified in the selected portion may also appear in other regions of the full gather, also referred to herein as the full record. The method 400 may enable the user to identify attributes that distinguish the noise train from the full record of the seismic data. Consequently, other regions in the full record with similar attributes may be identified.

For example, the noise train feature may have an amplitude above a certain threshold that distinguishes the feature in the selected portion. By identifying other regions in the full record with amplitudes above that threshold, other noise train features may be identified. As a consequence, the noise attenuation process may be applied to all regions in the full record where noise trains appear.

At step 410, a first portion of pre-stack seismic data may be displayed within the 3-D XYZ space. The displayed seismic data may represent one portion of the geological formation 105.

At step 420, a selection of a second portion of the seismic data within the first portion may be received. The second portion of the seismic data may identify an area within the 3-D XYZ space where the seismic data contains characteristics of note, such as a noise train feature. In one implementation, the selection of the second portion may be performed in a manner similar to the manner described above for selecting the probe 310.

At step 430, attributes that define the second portion may be determined. Beyond the area occupied in the 3-D XYZ space, the second portion of the seismic data may contain other attributes that distinguish the second portion from the first portion.

For example, the seismic data within the 3-D XYZ space may include an attribute, such as amplitude. The second portion may be distinguished from the first portion by a difference in amplitude that exists throughout the full gather of seismic data. More specifically, all data in the second portion may have an amplitude above a certain threshold, while all data in the first portion may have an amplitude below the threshold. Consequently, the amplitude threshold may be used to define the second portion. It should be noted that the seismic data may include many attributes, such as, root mean square velocity, and frequency content. These additional attributes may also be used to define the second portion.

In one implementation, visualization techniques may be employed to determine the attributes that define the second portion. Visualization techniques, such as amplitude thresholding, may be used to identify an amplitude threshold that distinguishes the second portion from the first portion as described above. Of course, other visualization techniques may be used to determine the attributes that define the second portion, such as, capacity rendering.

At step 440, regions having the attributes that define the second region may be identified in the full record of the seismic data. In the scenario where the second portion is defined by amplitudes under a specified threshold, regions in the 3-D XYZ space outside the second portion may be identified by amplitudes under the specified threshold. In one implementation, the attributes that define the second portion may be interpolated to the full record of the seismic data.

At step 450, the same seismic data process that is applied to the second portion may be applied to the identified regions. In the scenario where the noise attenuation process is applied to the noise train feature, noise attenuation may also be applied to other regions with the attributes that define the noise train.

Visualizing Seismic Data in 3-D XYZ Space

Figure 5:
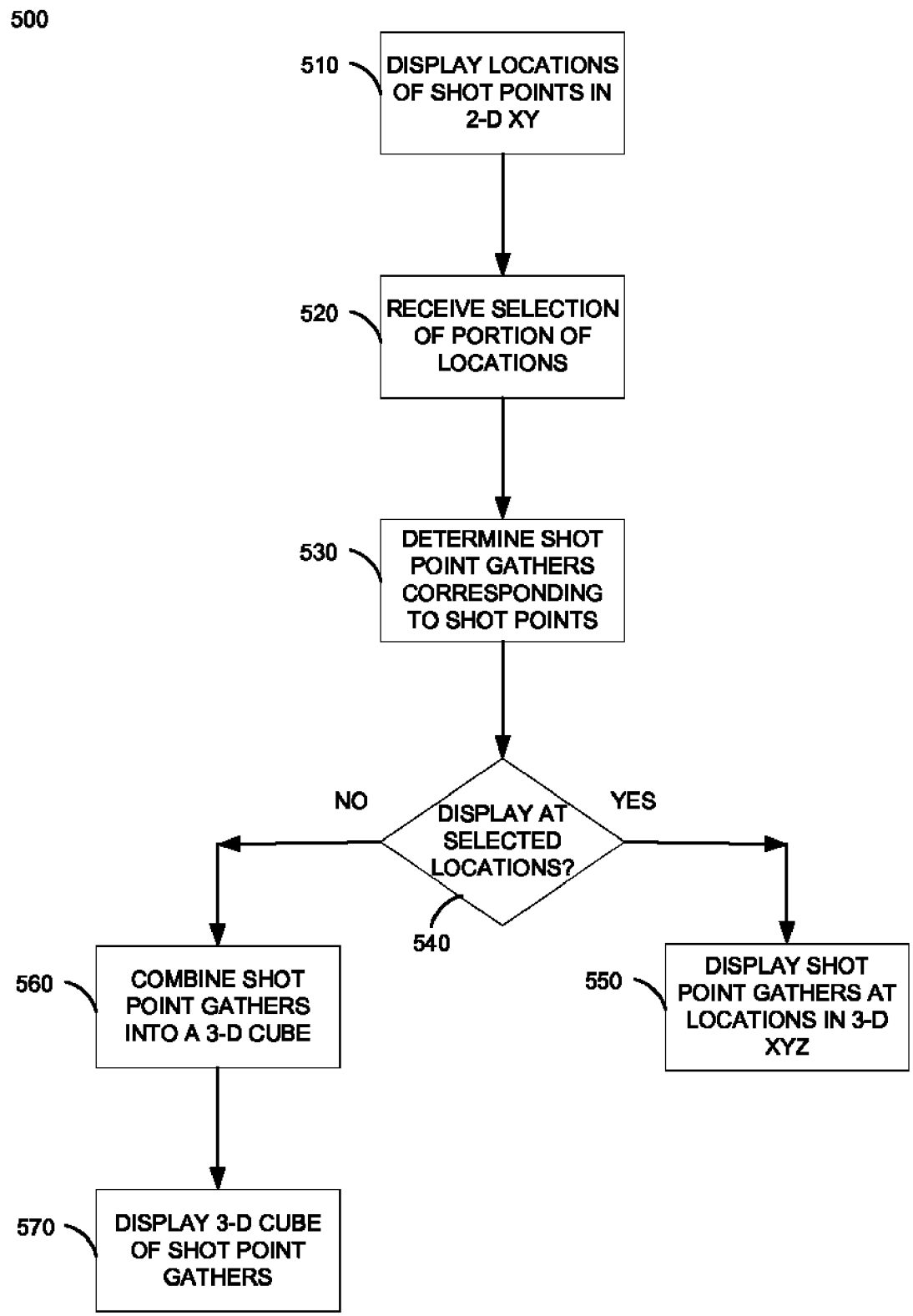
FIG. 5 illustrates a flow chart of a method for visualizing seismic data in accordance with implementations described herein.

FIG. 5 illustrates a flow chart of a method 500 for visualizing seismic data in accordance with implementations described herein. The method 500 may enable the user to view shot point gathers in 3-D space. The method 500 will be described with reference to FIGS. 6A-6B which illustrate visualizations of shot point gathers in a 3-D XYZ space 600 in accordance with implementations as described herein.

In a marine environment, the survey may be performed by towing the source 120 along a path, represented by a line 610. During a marine survey, the source 120 may be fired at a number of locations, referred to herein as shot points. The seismic data resulting from each firing of the source 120 may be illustrated in a shot point gather for each shot point.

At step 510, the locations of the shot points may be displayed in 2-dimensional XY space. As shown, the locations of the shot points A-F are displayed in an XY plane of the 3-D XYZ space 600.

At step 520, a selection of a portion of the locations may be received. For example, the locations for the shot points A, C, E, and F may be selected. At step 530, the shot point gathers corresponding to the selected portion of the locations may be determined.

Figure 6A:
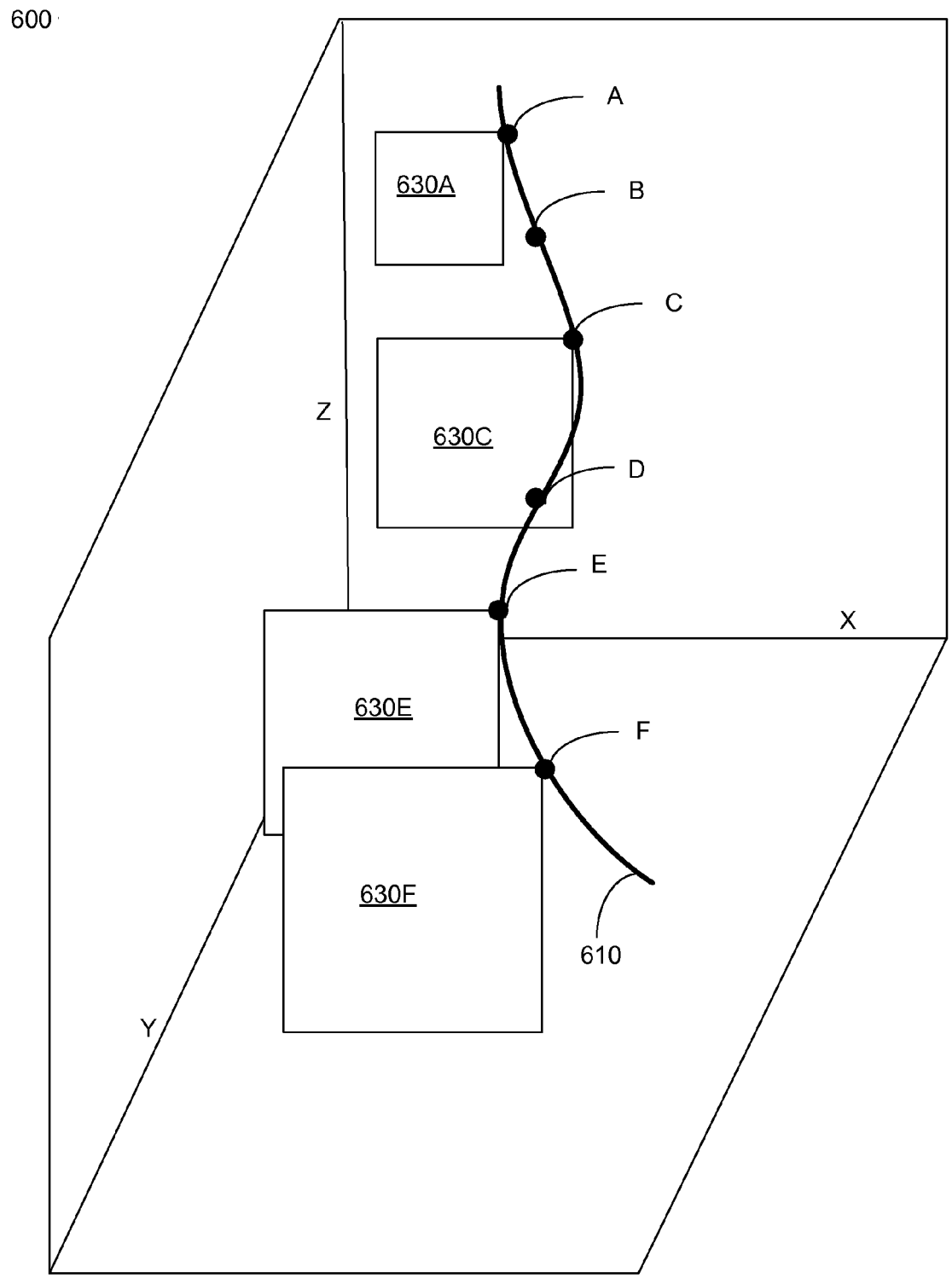
FIGS. 6A-6B illustrate visualizations of shot point gathers in a 3-D XYZ space in accordance with implementations described herein.
Figure 6B:
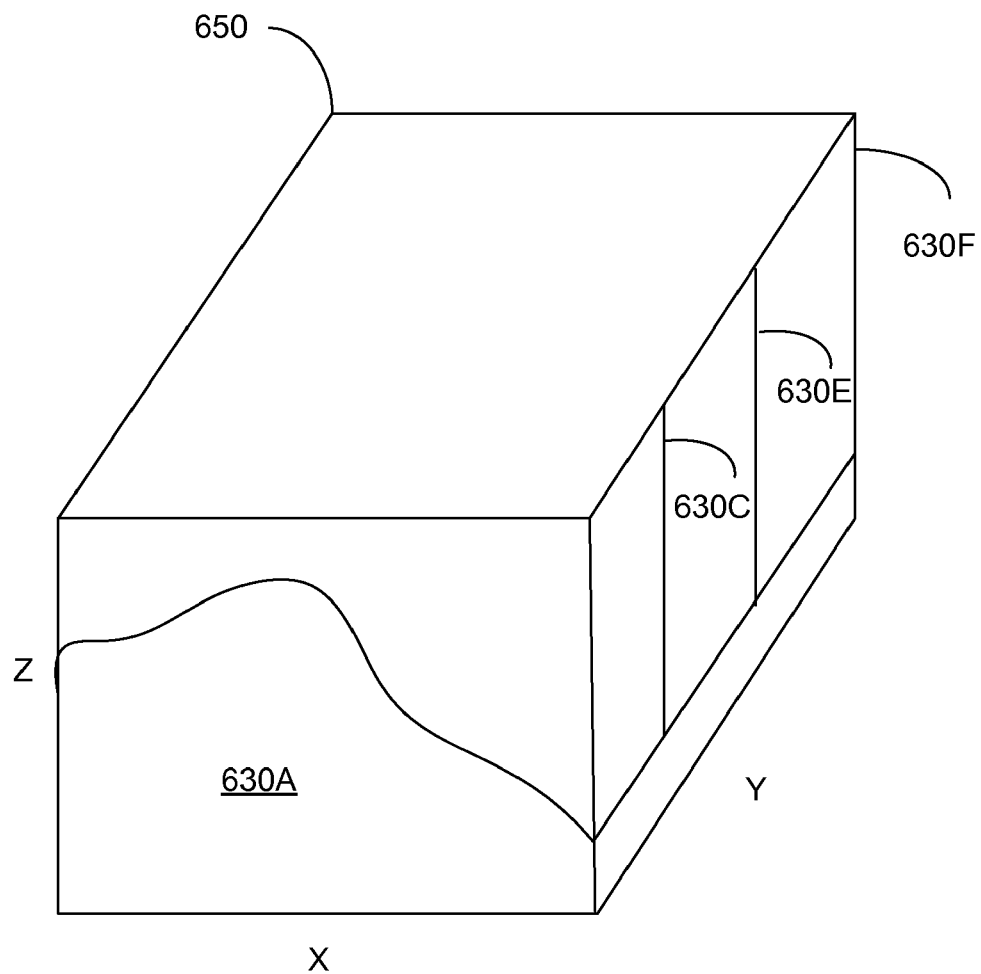

In one implementation, the method 500 may visualize shot point gathers at the locations of the corresponding shot points, as illustrated in FIG. 6A. Additionally, attributes of the shot point locations may be displayed. In another implementation, shot point gathers may be combined to visualize a 3-D cube 650, as illustrated in FIG. 6B. At step 540, it may be determined whether the shot point gathers are to be displayed at the selected portion of the locations. If so, at step 550, the shot point gathers 630A, 630C, 630E, and 630F, may be displayed at the selected portion of locations A, C, E, and F, as shown.

If not, at step 560, the shot point gathers 630A, 630C, 630E, and 630F, may be combined into the 3-D cube 650. At step 570, the 3-D cube 650 may be displayed. As shown in FIG. 6B, the 3-D cube 650 may include the combined shot point gathers. 630A, 630C, 630E, and 630F.

Figure 7:
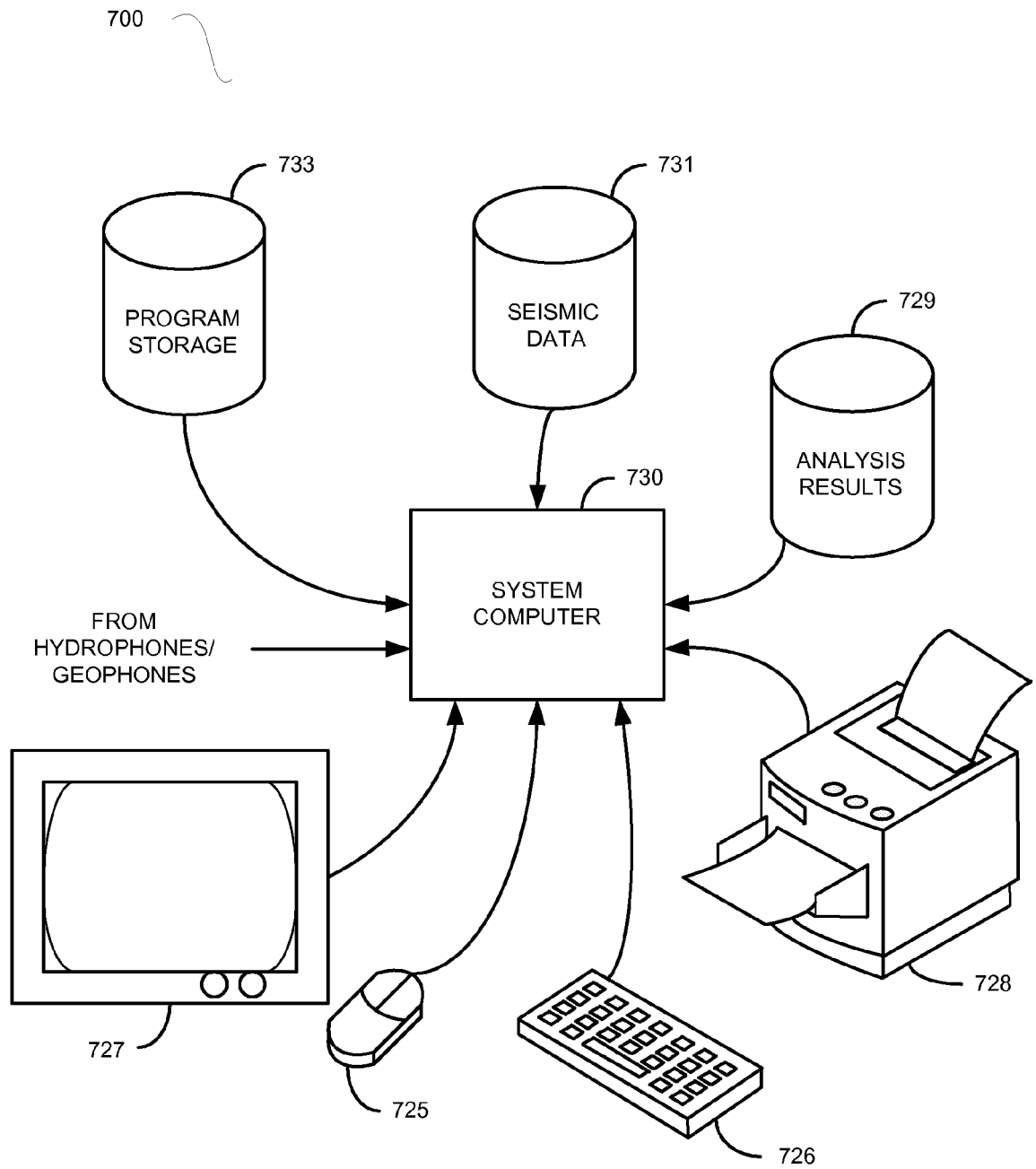
FIG. 7 illustrates a computer network into which implementations of various technologies described herein may be implemented.

FIG. 7 illustrates a computing system 700, into which implementations of various technologies described herein may be implemented. The computing system 700 may include one or more system computers 730, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 730 may be in communication with disk storage devices 729, 731, and 733, which may be external hard disk storage devices. It is contemplated that disk storage devices 729, 731, and 733 are conventional hard disk drives, and as such, will be implemented by way of a local area network or by remote access. It should be noted, however, that the devices 729, 731, and 733 are not limited to conventional hard disk drives, and may be any computer-readable media. Of course, while disk storage devices 729, 731, and 733 are illustrated as separate devices, a single disk storage device may be used to store any and all of the program instructions, measurement data, and results as desired.

In one implementation, seismic data from the receivers may be stored in disk storage device 731. The system computer 730 may retrieve the appropriate data from the disk storage device 731 to process seismic data according to program instructions that correspond to implementations of various technologies described herein. The program instructions may be written in a computer programming language, such as C++, Java and the like. The program instructions may be stored in a computer-readable medium, such as program disk storage device 733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 730.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 730 may present output primarily onto graphics display 727, or alternatively via printer 728. The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 may be in communication with the receivers (either directly or via a recording unit, not shown), to receive signals indicative of the reflected seismic energy. These signals, after conventional formatting and other initial processing, may be stored by the system computer 730 as digital data in the disk storage 731 for subsequent retrieval and processing in the manner described above. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for visualizing seismic data, comprising:
   displaying a plurality of shot point locations in a 2-dimensional (2-D XY) space;
   receiving a selection of a portion of the plurality of shot point locations;
   determining shot point gathers corresponding to the portion of the shot point locations; and
   displaying the shot point gathers at the selected portion of the shot point locations in a 3-dimensional XYZ (3-D XYZ) space.

2. The method of claim 1, further comprising displaying attributes of the selected portion of the shot point locations in the 3-D XYZ space.

3. The method of claim 1, wherein the XY plane in the 3-D XYZ space refers to the shot point locations and the XZ plane in the 3-D XYZ space refers to a subsurface of the shot point gathers.

4. The method of claim 1, wherein the plurality of shot locations are displayed on an XY plane of the 3-D XYZ space.

5. The method of claim 1, further comprising displaying a path along where the shot points were fired.

6. The method of claim 5, wherein the path is displayed on an XY plane of the 3-D XYZ space.

7. The method of claim 1, wherein the shot point gathers are displayed on a YZ plane of the 3-D XYZ space.

8. A method for visualizing seismic data, comprising:
   receiving a selection of a portion of a plurality of shot point locations;
   determining shot point gathers corresponding to the portion of the shot point locations; and
   combining the shot point gathers into a 3-dimensional (3-D) cube of shot point gathers.

9. The method of claim 8, further comprising displaying the 3-D cube in a 3-dimensional XYZ (3-D XYZ) space.

10. The method of claim 8, further comprising displaying the plurality of shot point locations in a 2-dimensional XY (2-D XY) space.

11. The method of claim 10, further comprising displaying attributes of the shot point locations in the 2-D XY space.

12. The method of claim 9, wherein a subsurface portion of the shot point gathers is illustrated on an XZ plane of the 3-D XYZ space.

* * * * *